United States Patent
Holmen et al.

[11] 3,803,549
[45] Apr. 9, 1974

[54] MAGNETOSTRICTIVE ANISOTROPIC THIN FILM PLATED WIRE LINE SENSOR INTRUDER DETECTOR HAVING MONOTONICALLY CHANGING PROPERTIES

[75] Inventors: James O. Holmen, Minnetonka; Vahram S. Kardashian, Plymouth Village, both of Minn.

[73] Assignee: Honeywell, Inc., Minneapolis, Minn.

[22] Filed: May 1, 1972

[21] Appl. No.: 248,821

[52] U.S. Cl. .............................................. 340/17
[51] Int. Cl. ............................................ G01v 1/16
[58] Field of Search ....... 340/258 R, 258 C, 15, 17, 340/261, 174 EB, 174 TF, 174 ZB, 174 MS, 174 PW, 173 MS; 73/70; 343/219, 220; 117/217

[56] References Cited
UNITED STATES PATENTS

| | | | |
|---|---|---|---|
| 3,258,762 | 6/1966 | Donner | 340/15 |
| 3,667,100 | 6/1972 | Marchal et al. | 117/217 |
| 3,611,341 | 10/1971 | Craig et al. | 340/258 R |
| 3,617,890 | 11/1971 | Kurauchi et al. | 340/258 C |
| 3,582,692 | 6/1971 | Palini | 340/261 |

*Primary Examiner*—Maynard R. Wilbur
*Assistant Examiner*—Theodore Blum
*Attorney, Agent, or Firm*—Lamont B. Koontz; Omund R. Dahle

[57] ABSTRACT

An improved strain responsive line sensor detection system which is selectively sensitive to motion of a mass on a surface. In a line sensor having an uniform thin film plated wire, the sensitivity of the line sensor falls off with distance of the intrusion from the source end of the line where are connected the high frequency drive and the processor electronics. In this invention, the thin film plated wire is made monotonically non-uniform along its length in one or more of its magnetic properties and parameters, i.e., the magnetostriction may have a gradient along its length, the plating thickness may have a gradient along its length and be made progressively thicker, and the $H_k$ may have a decreasing gradient along its length, to compensate in whole or in part for the losses in the plated wire thereby making it possible to extend the length of a thin film line sensor.

8 Claims, 6 Drawing Figures

PATENTED APR 9 1974 3,803,549

CONDUCTOR — 14
PERMALLOY PLATING — 13
INSULATION — 12
METAL SHIELD — 11
— 10

MAGNETOSTRICTION

DISTANCE ALONG WIRE

Hk

DISTANCE ALONG WIRE

SOURCE END OF WIRE
CONDUCTOR
PERMALLOY
INSULATION
REMOTE END OF WIRE
LIGHTLY MAGNETOSTRICTIVE
BeCu
BeCu
HIGHLY MAGNETOSTRICTIVE
PLATING THICKNESS GRADIENT

PLATING THICK'S

DISTANCE ALONG WIRE

HI-FREQ OSC.

PROCESSOR

3,803,549

MAGNETOSTRICTIVE ANISOTROPIC THIN FILM PLATED WIRE LINE SENSOR INTRUDER DETECTOR HAVING MONOTONICALLY CHANGING PROPERTIES

BACKGROUND OF THE INVENTION

The strain sensitive line sensor consists of a magnetostrictive thin film plated wire having uniaxial anisotropy which acts as a transducer converting displacement or movement of the earth to an electrical signal. The extended length of plated wire line can be placed on the floor of a shallow trench and covered for camouflage. It will detect intrusion in the immediate vicinity of the line. In principle, the weight of the intruder or that of any other moving load on the surface of a semi-infinite solid like the ground, physically disturbs the load supporting medium. The line sensor embedded in the medium is stressed by the displacement. The resulting strain on the wire generates a signal.

In operation, an alternating current is fed into the plated wire which generates an alternating magnetic field in the permalloy plating around the circumference of the wire. The alternating current magnetic field sets the magnetization vector in the plating into oscillation. This, in turn generates an alternating current electromotive force in the copper-beryllium core of the wire. The voltage output or signal is sinusoidal and constant in amplitude. Changes in the equilibrium orientation of the magnetization vector results in changes in the envelope of the signal amplitude. This appears as a modulation of a carrier similar in appearance to an amplitude modulation of a radio wave carrier.

In practice, the magnetostrictive plated wire is contained in an insulating flexible tube, such as a teflon tube. The wire and tubing are within a metallic shielded braid which, in turn, is protected by electrical insulation. The current flow through the plated wire may find its return through the metallic shield. The transducer output is detected, filtered through a low pass-band filter, and amplified to produce an analogue signal.

The output of the transducer is a function of the orientation of the magnetization vector relative to the easy axis. In a zero magnetostrictive anisotropic plated wire, the equilibrium orientation of the magnetization vector is determined by the component of the ambient magnetic field parallel to the hard axis of the wire. If the wire plating is also magnetostrictive, the same reorientation of the magnetization vector can also be achieved by straining of the wire. The output of the transducer, therefore, measures either the state of the ambient magnetic field or the state of strain to which the plated wire is subjected, or both.

The improved strain responsive thin film plated wire of this invention is made to have a plating which monotonically varies along its length in one or more of its magnetic properties and parameters. This is done to increase the voltage vs. strain response of the wire at the remote end as compared with the source end so that a given strain of the wire at or near the remote end produces a larger electrical signal than the same strain of the wire at or near the source end. This provides a compensation at least in part, for the normal losses in a wire line. This is to say, the plating may have a gradient in any one of or any combination of magnetostriction, deposit thickness or $H_k$ value.

A first of these magnetic properties is the magnetostriction coefficient $\eta$ of the magnetic thin film plating. The magnetostriction may be progressively changed along the length of the wire by shifting the composition of the permalloy plating.

A permalloy plating is normally defined as an alloy of nickel and iron having approximately 80% nickel and 20% iron. Also at or about the approximate composition 80–20%, permalloy has a zero magnetostrictive response while an iron rich (Fe more than 20%) composition has a positive magnetostriction and a nickel rich (Ni more than 80%) composition of plating has a negative magnetostriction. In addition to selecting a positive or negative magnetostriction, the degree of magnetostriction may be selected by controlling the variance of the composition away from the zero magnetostrictive composition. If for purposes of description in the specification and claims the composition at or about 80–20% be accepted as the zero magnetostriction crossover, then as the composition is made iron rich out to 78–22% or thereabout, the positive magnetostriction increases as a factor of the variance from 80–20%, and as the composition is made increasingly nickel rich out to 82–18% or thereabout, the negative magnetostriction increases as a factor of the variance from the composition of 80–20%.

A second of the magnetic properties is $H_k$ which may be progressively reduced along the wire from the source end to the remote end. A magnetic parameter which may be changed along the length of the wire is the plating thickness (T). Thus the thin film may be in the order of 5,000 Angstroms at the source end and in the order of 15,000 Angstroms or greater at the remote end. All or each of these variables in any combination adjust the plated wire response. These variables, $f(\eta,T,H_k)$ may be thought of as a magnetoelastic coupling coefficient. The EMF generated in the wire as a result of a strain S may be expressed as a function of strain and magnetoelastic coupling coefficient as follows $V=f(\eta,T,H_k)S = f(\eta_{(x)}, T_{(x)}, H_{k(x)})S$.

DESCRIPTION

Figure 1:
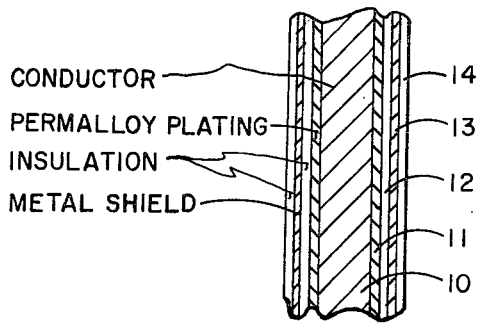
FIG. 1 is a cross section view of a section of thin film plated wire for use in an intruder detection system.

Referring now to FIG. 1, there is shown a cross section of a length of magnetostrictive thin film plated wire, such as is known in the art, and which may have, for example, a 10 mil diameter beryllium-copper substrate wire 10 which has been plated with a magnetic permalloy film 11 having uniaxial anisotropy and being of approximate composition of 79% Ni and 21% Fe. During deposition of the ferromagnetic film, a magnetic field is applied so that a preferred axis, called the easy axis, is obtained which is oriented circumferentially about the wire or with a small skew. The magnetization vector $\vec{M}$ may lie along this axis in the absence of external fields and make a loop of magnetic flux around the wire. The axis perpendicular to the easy axis is called the hard axis and its direction is more nearly along the wire. The plated wire is contained in a suitable electrical insulating tube or sheath 12. A metallic shield 13, such as a braided shield surrounds the sheath 12 and an outer electrical insulation 14 provides abrasion protection.

Figure 2:
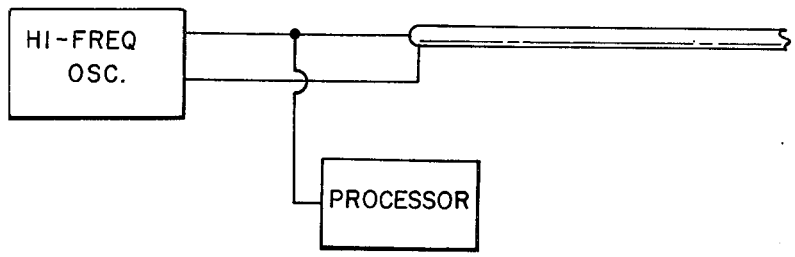
FIG. 2 is a diagrammatic showing of the intruder detector system using the improved wire

An extended length of this magnetostrictive thin film anisotropic plated wire is used in a line sensor intruder detection system to protect a perimeter which requires surveillance. A typical system is shown in FIG. 2. The strain sensitive line sensor is emplaced in a shallow trench and covered. The system will detect intrusion in the vicinity of the line, because the weight of the intruder or that of any other moving load on the surface of the ground, a semi-infinite solid, physically disturbs the load supporting medium. The line sensor embedded in the medium is stressed by the displacement and the resulting strain on the transducer generates a signal. The transducer output is detected, filtered through a low pass-band filter, and amplified to produce an analogue signal.

In operation, a sinusoidal or other alternating current is fed into the plated wire which generates an alternating magnetic field in the permalloy plating around the circumference of the wire. The A.C. magnetic field sets the magnetization vector in the plating into oscillation. This, in turn, generates an A.C. electromotive force in the Cu-Be core of the wire. The EMF output, or signal, is sinusoidal if the current is sinusoidal and constant in amplitude. Changes in the equilibrium orientation of the magnetization vector result in changes in the envelope of the signal amplitude. This appears as a modulation of a carrier similar in appearance to an amplitude modulation of a radio wave carrier.

When a plated wire is used which has uniform magnetic properties along its length, the sensitivity of the line sensor falls off with distance from the source end of the wire to the disturbance or intrusion thereby limiting cable lengths which can be used in a system. Another view is that the signal/noise ratio of the line is degraded with sensor length.

Figure 3:
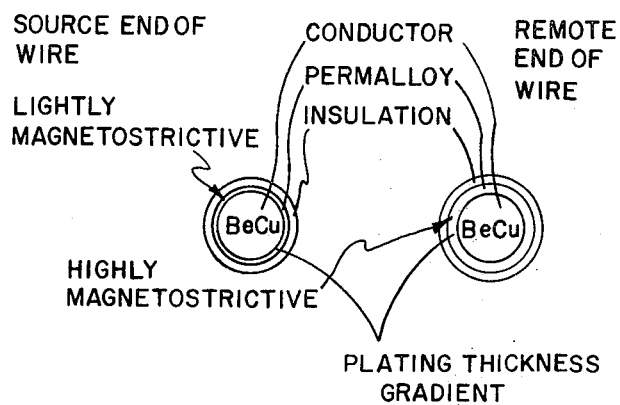
FIG. 3 is an end view of the plated wire at the source end of the wire and at the remote end of the wire

In our improved magnetostrictive plated wire the effective line sensor length is extended by the use of a wire having monotonically varying properties. Referring now to FIG. 3, there is disclosed a cross sectional view of opposite ends of the plated wire of our invention. It will be noted that there is a difference in various properties including the magnetostriction at the opposite ends of the wire and the difference in the plating thickness.

The anisotropic thin film permalloy possesses a gradient in magnetostriction along the wire. This is considered to be the most important single factor for the greater sensitivity of the line sensor at the far end. A magnetostrictive coefficient ratio at the "far-end" to the "source-end" in the order of 20:1 is feasible. The greater magnetostriction of the film at the far end causes the line sensor to possess greater sensitivity to strain at the distant location. Consequently, in spite of losses along the line, a significant signal may be transmitted over longer distances.

The anisotropic permalloy thin film may also possess a plating thickness gradient along the wire. The thickness at the "far-end" must still be in the range of thin film so as to not adversely affect the desired magnetic properties of the film. A permissible range of plating thickness varies from about 5,000 Angstroms at the "source-end" to about 15,000 Angstroms at the "far-end."

The anisotropic thin film may also possess a gradient in $H_k$ along the wire. for a single domain homogeneous ideal thin anisotropic film, $H_k$ is defined as that field necessary to rotate the magnetization of the domain completely to the hard axis direction. An $H_k$ ratio at the "far-end" to the "source-end" of 3:1 can be achieved without significantly altering the $H_c/H_k$ ratio of the permalloy film. The lower values of $H_k$ permit greater oscillatory response of the magnetization vector $\vec{M}$ to the drive current and also increase the strain induced rotational displacement of $\vec{M}$ generated by a stress signal. Since the high frequency drive current in the wire steadily decreases with distance along the wire, maintaining a gradient in $H_k$ along the wire permits longer cable lengths. The $H_k$ range is of the order of 3 oe. to 10 oe.

These three items, the magnetostriction, the plating thickness and the $H_k$, singly or in any combination, preferentially increase the far end sensitivity of the line sensor. These changes or gradients are easily incorporated into the wire because plated wire fabrication is a continuous process and the desired gradients are incorporated into the plating by controlled changes in several process parameters. The plating thickness can be related to the duration and efficiency of the deposition process. Bath constituent concentrations and electric field density are also factors in controlling the amount of material deposited on the wire. Process parameters which directly control or influence the plating thickness include: wire speed through the plating line, plating current density, bath pH and temperature, electrolyte agitation around the wire in the plating cells and concentration of major and minor bath constituents. These parameters can be controlled individually or in various combinations to yield the desired gradient in film thickness along the wire.

The magnetostriction coefficient, $\eta$, which is related to the film composition, can be effectively varied by controlling such parameters as electrolyte flow and agitation, electric field distribution, bath pH, temperature and concentration of major and minor constituents, and the deposition potential.

Figure 4:
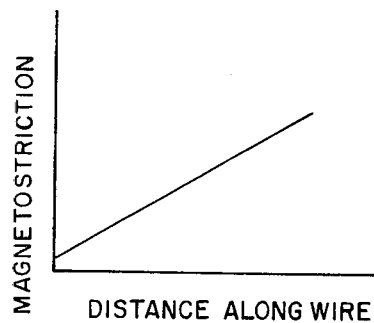
FIG. 4 is a graph showing the gradient in magnetostriction, $\eta$, along the length of the plated wire.
Figure 5:
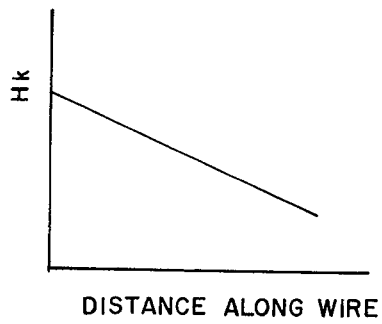
FIG. 5 is a graph showing the gradient in $H_k$ along the length of the plated wire; and, FIG. 6 is a graph showing the gradient in plating thickness along the length of the plated wire.
Figure 6:
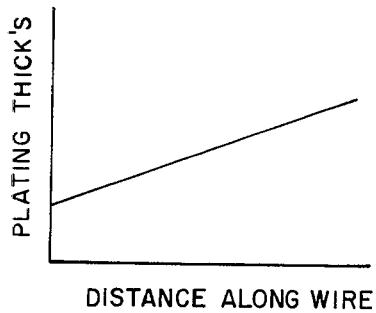

Similarly, control of $H_k$ can be effected by adjusting such plating parameters as bath additive concentrations, substrate topography control and stabilization anneal characteristics. Under certain deposition conditions, $h_k$ can be made to vary monotonically with the plating composition and thickness. Increased thickness and an increase in positive magnetostriction tends to reduce the level of $H_k$, all of which results in increased sensor sensitivity. The graphs of FIGS. 4, 5 and 6 show these gradients as a function of distance along the wire from the source end.

The embodiments of the invention in which an exclusive property or right is claimed are defined as follows:

1. An improved plated wire for use in an intrusion detection system which uses as a transducer an extended length of strain responsive anisotropic thin film plated wire, the source end of the wire being energized by the output of a high frequency oscillator and in which system because of losses in the plated wire it is desired that the voltage vs. strain response of the wire at the remote end produces a larger electrical signal at that point than the same strain at the source end, the improved plated wire comprising:

an extended length of wire substrate; and a strain responsive anisotropic magnetostrictive thin film deposit on said substrate, said deposit being monotonically varied along the length of said wire in that at least one of the characteristics of the magnetic deposit is progressively modified thereby providing a controlled variation of relevant properties along the length of said wire, the voltage vs. strain response along the length of said wire increasing progressively from a relatively low level response at the source end of the wire to a relatively large response at the remote end of the wire.

2. The invention according to claim 1 wherein said monotonically varied deposit comprises a progressive change of the composition of the magnetic thin film deposit along the length of the wire.

3. The invention according to claim 2 in which the deposit comprises nickel-iron.

4. The invention according to claim 2 in which the improved plated wire further comprises the thin film deposit on said substrate having a plating thickness gradient along the length of the wire which thickness increases monotonically from the source end to the remote end.

5. The invention according to claim 4 in which the plating thickness at the source end is in the order of 5,000 Angstroms and at the remote end in the order of 15,000 Angstroms.

6. The invention according to claim 2 in which the improved plated wire further comprises the thin film plating on said wire substrate having a $H_k$ gradient along the length of the wire which $H_k$ value decreases from the source end to the remote end.

7. The invention according to claim 1 wherein said monotonically varied deposit comprises a plating thickness gradient along the length of the wire.

8. The invention according to claim 1 wherein said monotonically varied deposit comprises a progressive reduction in the $H_k$ of the deposit along the length of the wire.

* * * * *